United States Patent [19]
Grabb et al.

[11] 3,880,049
[45] Apr. 29, 1975

[54] DUAL VALVE OPERATED PRESSURE DIFFERENTIAL SERVOMOTOR

[75] Inventors: Frederick G. Grabb; Carl D. Owens; Maxwell L. Cripe; Daniel C. Pulaski, all of South Bend, Ind.

[73] Assignee: The Bendix Corporation, South Bend, Ind.

[22] Filed: Dec. 26, 1973

[21] Appl. No.: 428,495

[52] U.S. Cl. .................. 91/33; 91/376; 91/446; 92/99
[51] Int. Cl. .................. F15b 9/10; F01b 25/02
[58] Field of Search ............... 91/6, 19, 31, 32, 33

[56] References Cited
UNITED STATES PATENTS
3,780,620  12/1973  Gardner .................................. 91/6

*Primary Examiner*—Paul E. Maslousky
*Attorney, Agent, or Firm*—Leo H. McCormick, Jr.; William N. Antonis

[57] ABSTRACT

A servomotor having a first valve for controlling the communication of vacuum and air at atmospheric pressure and a second valve for controlling the communication of air above atmospheric pressure to move a wall in response to a created pressure differential. A plunger moved by a push rod will progressively operate the first and second valves to provide a substantially uniform force for operating a brake actuator. A check valve located in the flow path of the air at atmospheric pressure will prevent the air above atmospheric pressure from being diverted to the atmosphere upon operation of the second valve.

12 Claims, 2 Drawing Figures

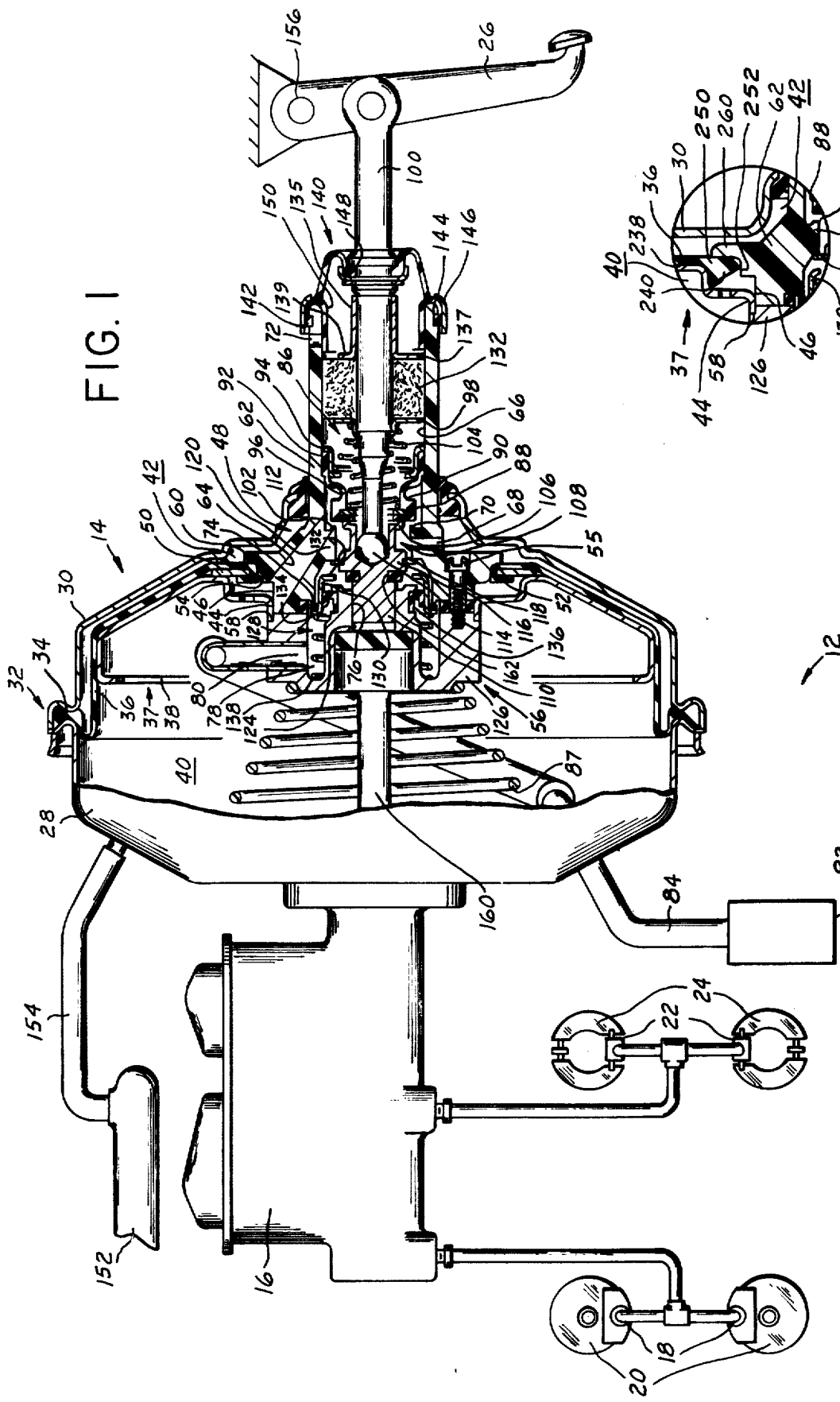

DUAL VALVE OPERATED PRESSURE DIFFERENTIAL SERVOMOTOR

BACKGROUND OF THE INVENTION

Car manufacturers in the United States are currently trying to reduce the overall weight of vehicles in an effort to increase the overall efficiency of fuel consumption at the same time safety bumpers, emission controls, roll bars and other safety features tend to nullify the other weight savings.

The emission controls have greatly reduced the production of vacuum at the intake manifold to an extent that the creation of an operational pressure differential with air at atmospheric pressure in a brake actuation servomotor can be insufficient to stop the vehicle.

In U.S. application Ser. No. 217,983 and now U.S. Pat. No. RE 28,191, incorporated herein by reference, it is disclosed how air above atmospheric pressure and vacuum can be presented to a servomotor for the creation of an operational braking force. However, under test conditions it has been determined that air at atmospheric pressure and vacuum are present in a sufficient intensity to stop most vehicles during normal braking.

In U.S. application Ser. No. 306,265 and now U.S. Pat. No. 3,780,620, incorporated by reference, it is disclosed how a servomotor may be sequentially presented with air at atmospheric pressure and air above atmospheric pressure by a selected position actuated valve actuated by engagement with a plunger. In this servomotor, the air above atmospheric pressure is directly communicated to the rear chamber. In the event that the valve is repeatedly oscillated by an operator within a short period of time, it is possible to deplete the source of air above atmospheric pressure and thereby eliminate the effectiveness of the servomotor in a braking situation.

SUMMARY OF THE INVENTION

We have devised a servomotor wherein an operational pressure differential is developed between vacuum and air at atmospheric pressure and air above atmospheric pressure to provide a uniform actuation force for operating a brake actuator. A first hub means retains a first valve means and a second hub means retains a second valve means. A push rod attached to a brake pedal will move a plunger means to progressively operate the first valve means and the second valve means. An annular rib on the plunger means will engage the housing of the first hub means to limit the direction of travel thereof in one direction while a resilient bumper will attenuate rapid movement in the other direction when the annular rib comes into actuation contact with the second valve means. A check valve in the first hub means will prevent air at atmospheric pressure from entering into the servomotor when the second means is opened. The resilient bumper in absorbing a portion of the input movement of the plunger will permit the actuation pressure differential build up across the separation wall between the front chamber and the rear chamber of the servomotor to be created in substantially a uniform manner and thereby reduce the possibility of depletion of the source of air above atmospheric pressure.

It is therefore the object of this invention to provide a servomotor with a progressional control for uniformly developing a pressure differential between vacuum and air at atmospheric pressure and air above atmospheric pressure.

It is another object of this invention to provide a plunger means for progressively operating a first valve and a second valve to uniformly create an operational pressure differential for a brake actuator.

It is a further object of this invention to provide a servomotor with a check valve means for communicating air at atmospheric pressure to a servomotor in a first conditional response and preventing air above atmospheric pressure to escape from the servomotor in a second conditional response.

It is still a further object of this invention to provide a servomotor with an operational plunger means having a bumper for attenuating a portion of the actuational input force and an annular rib for actuating a second valve to allow air above atmospheric pressure to develop a pressure differential when the actuation input reaches a predetermined level.

These and other objects of this invention will become apparent from reading this specification and viewing the drawings.

BRIEF DESCRIPTION OF THE DRAWINGS

FIG. 1 is a schematic illustration of a brake system having a servomotor with a control means for progressively presenting air at atmospheric pressure and air above atmospheric pressure to a servomotor for operating a brake actuator.

FIG. 2 is a sectional view of a secondary wall means for use in the servomotor of FIG. 1.

DETAILED DESCRIPTION OF THE PREFERRED EMBODIMENT

The vehicle braking system 12 shown in FIG. 1 consists of a servomotor 14 attached to a master cyclinder 16 for supplying pressurized hydraulic fluid to wheel cylinders 18 of the front brakes 20 and to wheel cylinders 22 of the rear wheel brakes 24 in response to an operator input to brake pedal 26.

The servomotor 14 has a front shell 28 joined to a rear shell 30 by a twist lock connection 32. The twist lock connection 32 holds external bead 34 of diaphragm 36 in a sealed condition. The diaphragm 36 and backing plate 38 form a wall means 37 which separates the interior of the servomotor into a front chamber 40 and a rear chamber 42. The backing plate 38 has a tubular section 44 which is located on a guide surface 46 of a first hub means 48. The backing plate 38 has an annular ring 50 attached thereto for radially holding the internal bead 52 of the diaphragm 36 on ledge 54 of the first hub means 48. A series of bolts 55, only one being shown, fasten a second hub means 56 to the first hub means 48 and in doing so act on end 58 of the tubular section 44 to axially seal bead 52 against shoulder 60 on the first hub means 48.

The first hub means 48 has a housing 62 with a rearward projection which extends through the rear shell 30. The housing 62 has a first passage 64 which connects the front chamber 40 with bore 66. A second passage 68 located inwardly from a vacuum seat 70, connects bore 66 with the rear chamber 42. A third passage 72 connects bore 66 with the atmosphere. The housing 62 has a rib 74 adjacent the end thereof for establishing an air above atmospheric pressure seat.

The second hub means 56 has a bore 76 with a concentric chamber 78. The chamber 78 is connected to a source 82 of air above atmospheric pressure through the entrance port 80 and conduit 84. The conduit 84 is coiled around return spring 87 to prevent interference upon movement of the wall means 37.

A first valve means 86 located in the bore 60 of the first hub means 48 consists of an annular poppet member 88 which is attached to a flexible tubular portion 90. The tubular portion 90 has a thickened end 92 which is fixed in the bore 66 by retainer 94. Thus, the poppet member 88 is free to move axially within the bore 66. A first spring 96 located between the poppet member 88 and stop 98 on push rod 100 urges the poppet member toward a rib or vacuum seat 102 on the housing 62. A second spring 104 located between the retainer 94 and the stop 98 urges atmospheric seat 106 on the plunger means 108 toward the poppet member 88 to prevent air at atmospheric pressure from entering the second passage 68 in the first hub means 48.

The plunger means 108 has a cylindrical body 110 with an axial bore 112 into which spherical head 114 of the push rod 100 is retained. An annular projection 116 on the periphery of the cylindrical body 110 has a groove therein. A snap ring 118 located in the groove engages rib or land 120 to limit the rearward movement through which spring 104 can return the push rod 100. A guide surface 122 extends from the annular projection 116 into a bearing and guide surface 124 in the housing 126 of the second hub means 56 to maintain the plunger means 108 in axial alignment with respect to the bore 66 in the first hub means 48.

A second valve means 128 is located in chamber 78 of the second hub means to prevent air above atmospheric pressure from being communicated to the second passage 68. The second valve means includes a sleeve means 130 which has an inwardly projecting flange end 132 and an outwardly projecting flange end 134. The sleeve means 130 is carried on a bearing seal 136 which permits axial movement thereof. A spring 138 located in chamber 78 acts on the sleeve means 130 to urge the outward projecting flange 134 into a sealing relationship with rib 74.

A filter 132 is located on the push rod 100 between stop 98 and retainer means 135. The retainer means 135 has a series of varying length fingers 137 and 139 to positively retain the filter 132 within the bore 66 without effecting the communication of air at atmospheric pressure from the third passage 72 to the second passage 68.

A boot means 140 has an external bead 142 which snaps into a groove 144 in the housing 62. A cap 146 is crimped onto the bead to positively retain the same in groove 144. An internal bead 148 is correspondingly positioned on the push rod 100. A skirt 150 extends from the external bead along the bore 66 past the third passage. The skirt has a series of slits adjacent the third passage 72 to produce a flapper control valve. The flapper will allow air at atmospheric pressure to pass through the third passage 72 but will prevent air above atmospheric pressure from passing from bore 66 into the atmosphere.

MODE OF OPERATION OF THE PREFERRED EMBODIMENT

With the motor of the vehicle running, vacuum will be produced at the intake manifold 152. This vacuum will be communicated through conduit 154 into the front chamber 40 of the servomotor 14. This vacuum will evacuate any air present in the rear chamber by way of the second passage 68, bore 66, and first passage 64 to permit return spring 86 to hold the wall means 37 against the rear shell 30.

Upon the operator desiring to stop the vehicle, an input force is applied to brake pedal 26. This input force is transmitted into linear movement as the pedal 26 pivots on pin 156. Initial movement of the push rod 100 will position the poppet member 88 on the vacuum seat 102 to interrupt communication of vacuum from the front chamber 40 to the rear chamber by the first passage 64. Further movement of the push rod 100 will move the atmospheric seat 106 on plunger means 108 away from the poppet member 88 to allow air at atmospheric pressure to flow past flapper in the skirt 150 of the boot means 140 into bore 66 and into the rear chamber 42 by way of the second passage 68.

With air at atmospheric pressure in the rear chamber 42 and vacuum in the front chamber 40, a pressure differential will be created across the wall means 37. This pressure differential will develop an operational force which will be transmitted through the tubular section 44 axially into the second hub means. As the operational force increases, the wall means 37 will be correspondingly moved to relay an operational force through push rod 160 to actuate the master cylinder 16.

If the operational pressure differential between vacuum and air at atmospheric pressure is insufficient to produce an adequate braking force, further input will be applied to the brake pedal 26. This further input will move resilient bumper 162 into engagement with the second valve means. A portion of the input force applied to the brake pedal 26, will be absorbed in the bumper means 162. As the resilient bumper means 162, which is located adjacent to the annular projection 116, is compacted, snap ring 118 will engage the inwardly projecting flange 132 to move flange 134 away from seat 74 to allow air above atmospheric pressure to enter the first bore 66 and pass into the rear chamber 42 through the second passage 68. The air above atmospheric pressure will act on flapper in skirt 150 to seal passage 72 and prevent the air above atmospheric pressure from escaping into the atmosphere.

With air above atmospheric pressure in the rear chamber 42 and vacuum in the front chamber 40, an operational pressure differential will be created to move the wall means 37 and operate the brake actuator.

Upon termination of the input force on the brake pedal, spring 138 will seat flange 134 on seat 74, spring 96 will hold the poppet 88 on atmospheric seat 106, and spring 104 will move the push rod 100 and attached plunger means 108 rearwardly until snap ring 118 engages rib 120. In this position vacuum available in the front chamber 40, will evacuate air from the rear chamber 42 to permit return spring 86 to move wall means 37 into contact with the rear shell 30.

In case of a panic stop, when the operator applies a rapid input to the brake pedal 26, the resilient bumper means 162 will absorb a portion of the input force to permit air at atmospheric pressure to enter into the rear chamber 42. In this manner, the second valve means 128 will not be activated until such time that the pressure differential between vacuum and air at atmospheric pressure is established.

In addition if vacuum is unavailable in the front chamber 40, a pressure differential between air and air above atmospheric pressure can create an operational force for energizing the master cylinder 16.

In the embodiment shown in FIG. 2, the wall means 37 includes a backing plate 238 which will bias bead 240 into contact with the shoulder 260 to both radially and axially seal the front chamber 40 from the rear chamber 42. The bead 240 has a contour which follows that of the backing plate 38 in such a manner that bolts 54 can exert a sufficient compressive force across area 250 that separation from the ledge 252 is prevented. In this embodiment the ring 50 has been eliminated resulting in a cost saving for the servomotor.

We claim:

1. In a servomotor having a wall means for separating a front chamber from a rear chamber, control means for sequentially regulating the communication of vacuum, air at atmospheric pressure and air above atmospheric pressure to the rear chamber to develop an operational force from a pressure differential to operate a brake actuator in response to an input force, said control means comprising:

first hub means connected to said wall means having a first housing with a first axial bore therein, said first housing having a first passage connecting the first axial bore with the front chamber, said housing having a second passage connecting the first axial bore with the rear chamber, said housing having a third passage connecting the first axial bore with the atmosphere;

second hub means connected to said first hub means for transmitting the operational force to said brake actuator from said wall means, said second hub means having a second housing with a second axial bore coaxial to said first axial bore, said second housing having an entrance port through which air above atmospheric pressure is communicated to the second bore;

first valve means located in said first axial bore for controlling the communication of vacuum through the first passage;

second valve means located in said second axial bore for controlling the communication of air above atmospheric pressure from the second bore;

plunger means located in said first and second axial bores for progressively operating the first and second valve means in response to said input force; and check valve means connected to the third passage in the first hub means for allowing air at atmospheric pressure to be communicated to said second passage when vacuum communication through the first passage is interrupted by movement of the first valve means and for preventing air above atmospheric pressure from entering the third passage when air above atmospheric pressure is presented to the second passage upon movement of the second valve means in response to movement of the plunger means.

2. In the servomotor, as recited in claim 1, wherein said first hub means includes:

a shoulder located between the second passage and the second hub means;

an annular ridge located adjacent the first passage, said first valve means engaging said annular ridge to prevent vacuum communication through said first passage; and an annular rib adjacent the forward end of the first axial bore.

3. In the servomotor, as recited in claim 2, wherein said plunger means includes:

a cylindrical body with an annular atmospheric seat for engaging said first valve means to interrupt communication of air at atmospheric pressure through the third passage;

an annular stop for engaging the shoulder on the first hub means to limit the movement with respect thereto; and a guide surface for engaging the second hub means to maintain the plunger means in axial alignment with the first axial bore of the first hub means.

4. In the servomotor, as recited in claim 3, wherein said first valve means includes:

a tubular member located in said first axial bore having a first end fixed in said first hub means and a second end free to move axially within said bore;

first resilient means connected to said plunger means for holding said annular stop against the shoulder; and second resilient means connected to said plunger means for holding said free end against said annular atmospheric seat with said annular stop against the shoulder and against the annular ridge upon movement of the annular stop away from the shoulder.

5. In the servomotor, as recited in claim 4, wherein said second valve means includes:

sleeve means concentric to said second axial bore having a first end with an outwardly projecting annular surface and a second end with an inwardly projecting surface; and a third resilient means connected to said second hub means for urging the outwardly projecting annular surface of the sleeve means into engagement with an annular rib to seal the air above atmospheric pressure present at said air entrance port from entering the first bore.

6. In the servomotor, as recited in claim 5, wherein said annular stop on the plunger means upon movement thereof in response to an input force will engage the inwardly projecting surface of said sleeve means to allow communication between the entrance port and the first axial bore.

7. In the servomotor, as recited in claim 6, wherein said plunger means further includes:

bumper means located adjacent the annular stop for absorbing a portion of the input force transmitted through the plunger means to allow air at atmospheric pressure to initially be presented to the rear chamber through the second passage upon movement of the plunger means.

8. In the servomotor, as recited in claim 7, wherein said plunger means includes:

a push rod having a spherical head for moving said cylindrical body in response to said input force; and retainer means located on said push rod for moving a filter means along with the plunger means and for preventing the filter means from interferring with the operation of the check valve means.

9. In the servomotor, as recited in claim 8, wherein said check valve means includes:

boot means having a first peripheral bead located in a groove on the periphery of the first hub means and a second bead secured to said push rod, said boot having a skirt which axially extends into the first bore past the third passage, said skirt creating a flapper moving away from the third passage in response to air at atmospheric pressure flowing therethrough and toward the third passage in response to air above atmospheric pressure.

10. In the servomotor, as recited in claim 9, wherein said wall means includes:
   a backing plate having a tubular surface along the inner periphery thereof, said tubular surface being located on a guide surface on the first hub means, said tubular surface transmitting the operational force derived from the pressure differential to the second hub means; and
   a diaphragm having an inner periphery held against an annular peripheral projection on the first hub means by the backing plate to provide a sealed separation between the front and rear chambers.

11. In the servomotor, as recited in claim 10, wherein said backing plate includes:
   an annular ring extending inwardly therefrom into engagement with the diaphragm to provide a radial sealing force with the first hub means.

12. In the servomotor, as recited in claim 8, wherein said check valve means includes:
   boot means having a first peripheral bead located in a groove on the periphery of the first hub means and a second bead secured to said push rod, said boot having a skirt which axially extends into the first bore past the third passage, said skirt having a series of axial slits adjacent the third passage to create a flapper moving away from the third passage in response to air at atmospheric pressure flowing therethrough and toward the third passage in response to air above atmospheric pressure.

* * * * *